United States Patent [19]
Dorgebray

[11] 3,817,086
[45] June 18, 1974

[54] METHOD AND DEVICE FOR DETECTING AND LOCATING LEAKS IN BURIED PIPELINES

[75] Inventor: Gérard Dorgebray, La Chaussee D'Ivry, France

[73] Assignee: Elf-Union S.A., Paris, France

[22] Filed: Jan. 17, 1972

[21] Appl. No.: 218,059

[30] Foreign Application Priority Data
Jan. 19, 1971 France.............................. 71.01604

[52] U.S. Cl................ 73/40.5 R, 33/141 G, 138/90
[51] Int. Cl. ............................................ G01m 3/28
[58] Field of Search............... 73/40.5 R, 49.1, 391; 33/141 G; 138/97, 90

[56] References Cited
UNITED STATES PATENTS
2,292,938  8/1942  Hennessy.......................... 33/141 G
2,782,370  2/1957  Ver Nooy ........................ 73/40.5 R
3,132,506  5/1964  Pritchett ......................... 73/40.5 R
3,400,574  9/1968  Cramer............................ 73/40.5 R
3,495,546  2/1970  Brown............................. 73/40.5 R Primary Examiner—Richard C. Queisser
Assistant Examiner—Daniel M. Yasich
Attorney, Agent, or Firm—Lane, Aitken, Dunner & Ziems

[57] ABSTRACT

A detection scraper piston which is moved with the flow of liquid transported by a pipeline is fitted with end cups defining an intermediate compartment within the pipeline bore, with an odometer for measuring the distance of travel and pressure-sensing and measuring means.

The method of leak detection consists in continuously measuring the displacement of the piston from a predetermined zero point as well as the difference between the pressure within the compartment and an intermediate pressure between those prevailing on the upstream and downstream sides of the piston.

9 Claims, 3 Drawing Figures

PATENTED JUN 18 1974 3,817,086
SHEET 1 OF 2

METHOD AND DEVICE FOR DETECTING AND LOCATING LEAKS IN BURIED PIPELINES

This invention relates to the detection and location of leaks in a buried conduit used for conveying liquids and especially a pipeline for transporting hydrocarbons.

There are already a number of methods for detecting leakages in oil pipelines. Some of these methods entail the use of radioactive tracers and consist in passing through the pipeline a volume of fluid in which a radioactive tracer has been dispersed, usually by dissolution, then removing practically the entire tracer content from the pipe by rinsing and if necessary by passing a scraper piston within the interior and finally in moving a detector piston through the line in order to detect the points at which the tracer has sorbed in the soil surrounding the pipeline after escaping from this latter through leaks at the same time as the fluid.

A method of this type is described in French Pat. No. 2,088,609 granted to Elf-Union, S.A. This method proves wholly satisfactory since it permits accurate localization of leaks and provides indications which can readily be processed.

However, as is the case with all methods which make use of radioactive tracers, this method is open to certain criticisms. In the first place, a radioactive marker product has to be mixed with the transported fluid, thereby making it necessary to take special precautions and to program the injection of the product into the transported fluid. Moreover, any accidental interruption of use of the pipe during the operation disturbs the results since the radioactive tracer must have a short period of activity.

The aim of this invention is to obviate these disadvantages. The invention accordingly proposes a method which consists in moving through the pipeline a detection piston fitted with packing-rings which define an annular compartment and in continuously measuring the displacement of said detection piston from a predetermined point of origin and the difference between on the one hand the pressure of the compartment and on the other hand a pressure of intermediate value between those prevailing on the upstream and downstream sides of the piston. It is obviously possible to record the value of said displacement only when said difference exceeds a predetermined threshold.

In practice, the pressure which is of intermediate value between those prevailing on the upstream and downstream sides of the piston and which serves as a reference pressure can be produced in a simple manner by means of a passage having a small cross-sectional area which establishes a communication between the upstream and downstream sides of the piston and by exposing a sensing element to the prevailing pressure at a point of the passage which is located at a distance from the two ends of this latter. This passage can be either isolated from the intermediate compartment or connected to this latter by means of a narrow orifice forming a nozzle having a sufficiently small cross-sectional area to prevent any excessive reduction in the pressure detected by the sensing element which is placed in the passage.

The invention further proposes a device for carrying out the method hereinabove defined. Said device comprises a piston fitted with an odometer which measures the distance of travel of the piston and with packing-rings which are intended to be applied against the wall of the pipeline so as to define a compartment within this latter and which contain an apparatus for measuring the difference between the pressure of said compartment and a pressure of intermediate value between those prevailing on the upstream side and downstream side within the pipeline. A threshold circuit can be provided for initiating the recording of the indications of the odometer each time the pressure difference exceeds the threshold value.

A better understanding of the invention will be obtained from the following description of one particular embodiment which is given by way of example and in which no limitation is implied, reference being made to the accompanying drawings, wherein.

Figure 1:
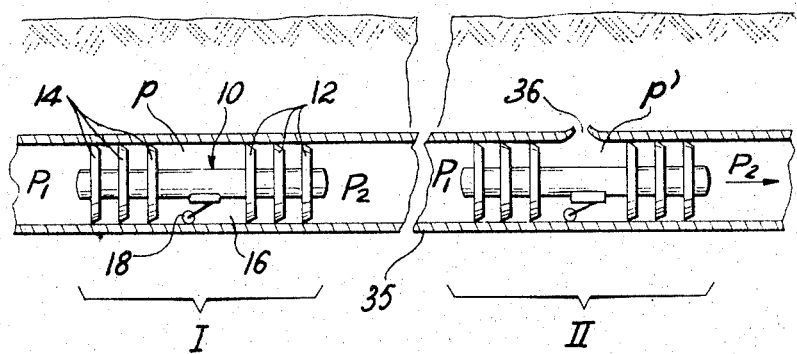
FIG. 1 is a general arrangement diagram showing the scraper piston in two successive positions within the pipeline to be tested.
Figure 3:
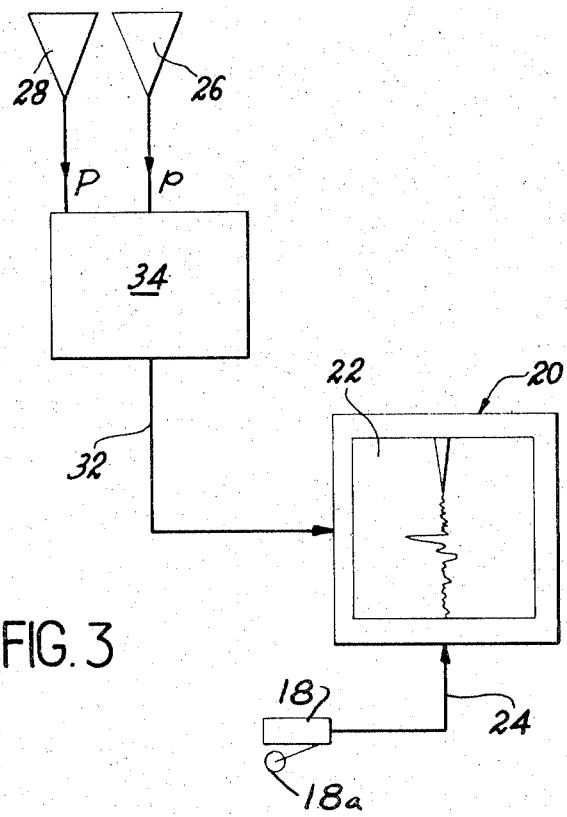
FIG. 3 is a general arrangement diagram of the mechanism for recording the pressure difference as a function of the distance traveled by the scraper piston.

The method which will now be described by way of example is intended to be applied to the detection of leaks in a buried oil pipeline.

The piston 10 (shown in FIG. 1) has a conventional external appearance and comprises a leak-tight cylindrical body which is capable of affording resistance to the pressure within the pipe and on which are fitted two sets of packing-rings. There are disposed within the body an odometric device which serves to measure the distance covered by the piston, a pressure measuring device which serves to measure the pressure difference and batteries which ensure sufficient autonomy of operation. Provision is made between the set of upstream packing-rings 12 and the set of downstream packing-rings 14 for an annular compartment 16.

The odometric means for counting the distance of travel comprises an odometer wheel 18a which is rotatably mounted on the body of the piston 10. Transmission of data supplied by the wheel 18a to the electronic circuits which are placed within the piston body can be carried out by means of an electronic system 18 which is identical with that described in French Pat. No. 2,088,609 as cited earlier and serves to initiate a supply of recordable indications by the odometer when the pressure difference exceeds a pressure difference threshold value.

Figure 2:
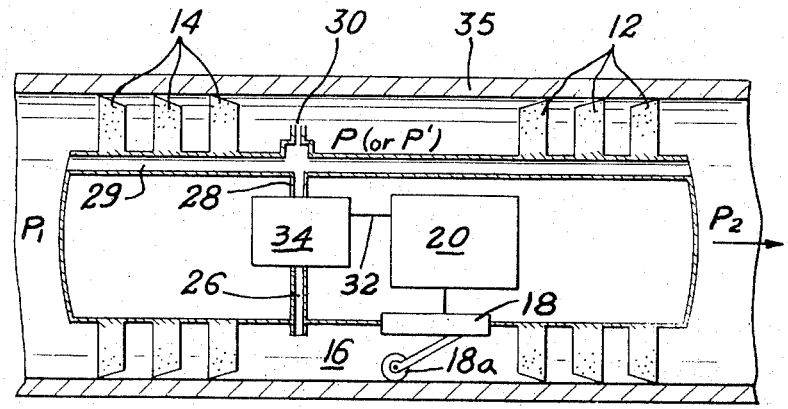
FIG. 2 shows the arrangement of the pressure inlets on the piston of FIG. 1.

In the embodiment which is shown diagrammatically in FIG. 2 and which employs a paper-strip recorder 20, the odometer wheel 18a initiates through the electronic system 18 either step-by-step or continuous forward motion of the strip 22 (input 24 of the recorder 20). This method of recording is acceptable whenever the pipeline sections to be tested do not exceed 100 to 200 kms. For example, if the strip is unwound at a rate of one millimeter per meter, there will thus be obtained a strip having a length of 100 to 200 m which can be placed within a piston without any major difficulty and checked within a reasonably short period of time. On the contrary, a distance recording initiated in the event of leakage by a threshold system which can be similar to that described in the above-mentioned French patent is particularly well suited to pipelines of substantial length. It is evident that the two systems can also be combined.

The piston 10 is provided with a pressure inlet designated by the reference 26 in FIGS. 1 and 2 and responsive to the pressure $p$ which prevails within the intermediate compartment 16, and with a second pressure inlet 28 which is responsive to the average value p of the pressures $p_1$ and $p_2$ prevailing within the pipeline on each side of the piston. This second pressure inlet is connected to the mid-point of a passage 29 (FIG. 2) having a small and constant cross-sectional area which provides a communication between the upstream and downstream sides of the piston. This passage also communicates with the compartment 16 by means of a calibrated orifice 30 of small diameter which is placed in proximity to the pressure inlet 28. Under these conditions, the pressure p which prevails within the passage 29 is substantially equal to the half-sum of the pressures upstream $p_1$ and downstream $p_2$ of the piston, any difference in pressures being accompanied by a flow corresponding to a pressure drop which is equal to this difference.

The two aforesaid pressure inlets are connected to a differential pressure measuring device 34 including pressure-sensing elements which can be constituted by strain gages carried by deformable diaphragms or by any other suitable transducer having low inertia.

The pressure-inlets 26 and 28 are connected to the differential pressure-measuring device 34 and this latter supplies at its output 32 which is connected to the recorder 20 a voltage which is proportional to the difference between the average pressure P supplied by the pressure-sensing element inlet 28 and the pressure $p$ supplied by the pressure-inlet 26. The device 34 will be constituted by a wholly electric and differential circuit in the event that the sensing elements are strain gages. In other cases, the device 34 must be fitted with a differential pressure gage, the deformable element of which controls a potentiometer.

The operation of the device at the time of testing of a buried pipeline is accordingly as follows:

the recorder 20 and ancillary elements are connected to a power supply (consisting as a rule of batteries disposed within the piston). The piston 10 is introduced at the upstream end of the pipeline 35 and passed through the entire length of the pipeline at the same time as the liquid which is being conveyed. The recorder 20 begins to unwind only in dependence on the indications supplied by the wheel 18a, which serves to guard against any variations in the rate of flow of the liquid within the pipeline.

As long as the piston travels within a portion of the pipeline in which no leakage is present (position designated by I in FIG. 1), the pressure $p$ which prevails within the annular compartment 16 is very close in value to the weighted mean pressure P of the upstream and downstream pressures $p_1$ and $p_2$ within the pipeline. When, on the contrary, the piston arrives in a position in which the annular compartment 16 opens to the exterior through a leak 36 (position illustrated at II in FIG. 1), there takes place a rapid pressure drop within the compartment and a circulation of liquid through the communication orifice 30 for re-balancing the pressure $p'$ leakage with the pressure p. The flow of liquid through the orifice 30 is detected as a result of the pressure difference produced by said orifice between the upstream and downstream side of this latter. This pressure difference appears clearly on the paper strip 22 in the form of a peak, the length of which is governed essentially by the rate of displacement of the piston and the height of which is dependent on the extent of leakage. The transducers included in the device 34 can be provided with conventional means (such as electric filters, for example) for attenuating erratic variations, the duration of which in particular does not correspond to the "signature" of a leak.

By way of example, in the case of an oil pipeline having a flow rate of 2,000 m³/hr, a leak rate of 1 l/hr will result in a pressure difference of the order of 0.65 millibar which is readily detected by commercially available instruments such as the detector marketed by Societe Schlumberger under the denomination 604 H/d. Rebalancing of pressures after the piston has passed beyond the leak is carried out at a suitable rate by means of a calibrated orifice of approximately 0.8 mm².

The advantages of the invention over the methods and devices which make use of a radioactive tracer are clearly brought out by the foregoing description. No special precaution is necessary since there is no need to introduce any foreign substance in the transported fluid. Operation of the pipeline is practically not disturbed during testing. Moreover, the testing operation itself is limited to the displacement of the scraper piston whereas, in the method involving the use of a tracer, it is necessary to rinse the duct and in many cases to pass a scraper piston through this latter for cleaning purposes before finally introducing the detector piston. Highly accurate localization of leakage can be ensured by making use of an odometer. Finally, the pressure measurement is suited to many alternative modes of operation and especially either to continuous recording as a function of the distance or on the contrary to printing of the distance of travel solely when a leak is located. In general, the invention is evidently not limited solely to the embodiment hereinabove described with reference to the drawings and the scope of this patent extends to any alternative arrangement which remains within the definition of equivalent means.

What we claim is:

1. A method for detecting and locating leaks in an underground pipeline for transporting liquid comprising the steps of: moving through the pipeline a piston which is carried by the liquid, continuously measuring the displacement of said piston from a predetermined point of origin, and continuously measuring and registering the difference between the pressure within an annular compartment defined by packing-rings applied against the pipeline wall and carried at the ends of said piston and a pressure of the average value between those pressures prevailing on the upstream and downstream sides of said piston.

2. A method according to claim 1 including the continuously recording pressure difference as a function of the distance of travel.

3. A method according to claim 1 including the recording at the same time the distance of travel and said pressure difference when said difference passes a predetermined threshold value.

4. A device for detecting and locating leaks in a buried pipeline for transporting liquid comprising: a piston, an odometer supported by said piston for measuring the distance traveled by the piston, packing rings applied against the pipeline wall defining an annular compartment within the pipeline, an open conduit extending through both ends of the leak detecting device, a first pressure inlet connected to the annular compartment and a second pressure inlet connected intermediate the ends of said conduit, and means contained in said piston connected to said first and second pressure inlet for measuring the difference between the pressure within said compartment and a pressure of average value between those pressures on the upstream side and downstream side of said piston.

5. A device according to claim 4, comprising a recorder for recording ariations in the pressure difference as a function of the distance of travel.

6. A device according to claim 4, wherein said measuring apparatus is responsive to the difference between the pressure within the compartment and the pressure at one point of a passage which connects the upstream side to the downstream side of the piston, said point being located intermediate with respect to the two ends of said passage.

7. A device according to claim 6, wherein said passage communicates with the compartment by means of a calibrated orifice.

8. A device according to claim 7, wherein said orifice is placed in proximity to the point of the passage in which the pressure is compared with the prevailing pressure within the compartment.

9. A device according to claim 6, wherein said point located intermediate with respect to the two ends of said passage is chosen within said passage at a location such that the pressure maintained therein is substantially equal to the mean value of pressures on the upstream side and downstream side of the piston.

* * * * *

UNITED STATES PATENT OFFICE
CERTIFICATE OF CORRECTION

Patent No. 3,817,086　　　　Dated June 18, 1974

Inventor(s) Gerard Dorgebray

It is certified that error appears in the above-identified patent and that said Letters Patent are hereby corrected as shown below:

At column 3, line 31, delete "sensing element";
At column 5, line 10 (Claim 5, line 2), "ariations" should be --variations--.

Signed and sealed this 10th day of December 1974.

(SEAL)
Attest:

McCOY M. GIBSON JR.
Attesting Officer

C. MARSHALL DANN
Commissioner of Patents